US008215288B2

(12) United States Patent
Gwidt et al.

(10) Patent No.: US 8,215,288 B2
(45) Date of Patent: Jul. 10, 2012

(54) CONTROL SYSTEM AND METHOD FOR CONTROLLING AN ENGINE IN RESPONSE TO DETECTING AN OUT OF RANGE PRESSURE SIGNAL

(75) Inventors: Jesse M. Gwidt, Brighton, MI (US); Michael J. Lucido, Northville, MI (US); Jon C. Miller, Fenton, MI (US); Michael N Kotsonas, Highland, MI (US)

(73) Assignee: GM Global Technology Operations LLC

( * ) Notice: Subject to any disclaimer, the term of this patent is extended or adjusted under 35 U.S.C. 154(b) by 565 days.

(21) Appl. No.: 12/485,313

(22) Filed: Jun. 16, 2009

(65) Prior Publication Data
US 2010/0280742 A1    Nov. 4, 2010

Related U.S. Application Data

(60) Provisional application No. 61/173,772, filed on Apr. 29, 2009.

(51) Int. Cl.
*F02M 1/00* (2006.01)
(52) U.S. Cl. .................. 123/457; 123/447; 73/114.43
(58) Field of Classification Search .......... 123/445–447, 123/456, 457, 461, 478, 480, 357, 511; 73/114.43
See application file for complete search history.

(56) References Cited

U.S. PATENT DOCUMENTS

| | | | |
|---|---|---|---|
| 5,400,018 A | 3/1995 | Scholl et al. | |
| 5,864,773 A | 1/1999 | Barna et al. | |
| 6,014,598 A | 1/2000 | Duyar et al. | |
| 6,202,009 B1 | 3/2001 | Tseng | |
| 6,293,757 B1 * | 9/2001 | Oda et al. | 417/53 |
| 6,721,639 B2 | 4/2004 | Raypole et al. | |
| 6,722,345 B2 * | 4/2004 | Saeki et al. | 123/435 |
| 6,843,537 B2 | 1/2005 | Babala et al. | |
| 6,868,325 B2 | 3/2005 | Menon et al. | |
| 6,971,368 B2 * | 12/2005 | Uchiyama | 123/359 |
| 6,975,936 B2 * | 12/2005 | Akuzawa et al. | 701/114 |
| 7,007,676 B1 * | 3/2006 | Schuricht et al. | 123/479 |
| 7,076,347 B2 | 7/2006 | Lehner et al. | |
| 7,461,634 B2 * | 12/2008 | Watanabe et al. | 123/446 |
| 7,593,796 B2 | 9/2009 | Prokhorov | |
| 7,650,226 B2 * | 1/2010 | Ishizuka et al. | 701/114 |
| 7,933,712 B2 * | 4/2011 | Ishizuka et al. | 701/114 |
| 8,061,329 B2 * | 11/2011 | Pursifull et al. | 123/446 |
| 8,091,532 B2 * | 1/2012 | Wang et al. | 123/446 |
| 2006/0047403 A1 | 3/2006 | Volponi et al. | |
| 2006/0282200 A1 | 12/2006 | Thiel et al. | |
| 2009/0049898 A1 | 2/2009 | Elkolaly | |
| 2011/0022290 A1 * | 1/2011 | Kaneko et al. | 701/103 |

OTHER PUBLICATIONS

U.S. Appl. No. 12/431,134, filed Apr. 28, 2009, Wang et al.

* cited by examiner

*Primary Examiner* — John Kwon

(57) ABSTRACT

A method and control module for operating an engine that includes a pressure range determination module that determines a pressure value for a pressure sensor in a fuel rail is out of range. A fuel rail pressure estimate module that determines a predicted pressure value. An engine control module that operates the engine using the predicted pressure value.

20 Claims, 5 Drawing Sheets

CONTROL SYSTEM AND METHOD FOR CONTROLLING AN ENGINE IN RESPONSE TO DETECTING AN OUT OF RANGE PRESSURE SIGNAL

CROSS-REFERENCE TO RELATED APPLICATIONS

This application claims the benefit of U.S. Provisional Application No. 61/173,772, filed on Apr. 29, 2009. The disclosure of the above application is incorporated herein by reference in its entirety.

FIELD

The present disclosure relates to diagnostic systems for electronic control systems, and more particularly, to control systems and methods for detecting an out of range condition for sensors of the electronic control systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Direct injection gasoline engines are currently used by many engine manufacturers. In a direct injection engine, highly pressurized gasoline is injected via a common fuel rail directly into a combustion chamber of each cylinder. This is different than conventional multi-point fuel injection that is injected into an intake tract or cylinder port.

Gasoline-direct injection enables stratified fuel-charged combustion for improved fuel efficiency and reduced emissions at a low load. The stratified fuel charge allows ultra-lean burn and results in high fuel efficiency and high power output. The cooling effect of the injected fuel and the even dispersion of the air-fuel mixture allows for more aggressive ignition timing curves. Ultra lean burn mode is used for light-load running conditions when little or no acceleration is required. Stoichiometric mode is used during moderate load conditions. The fuel is injected during the intake stroke and creates a homogenous fuel-air mixture in the cylinder. A fuel power mode is used for rapid acceleration and heavy loads. The air-fuel mixture in this case is a slightly richer than stoichiometric mode which helps reduce knock.

Direct-injected engines are configured with a high-pressure fuel pump used for pressurizing the injector fuel rail. A pressure sensor is attached to the fuel rail for control feedback. The pressure sensor provides an input to allow the computation of the pressure differential information used to calculate the injector pulse width for delivering fuel to the cylinder. Errors in the measured fuel pressure at the fuel rail result in an error in the mass of the fuel delivered to the individual cylinder.

SUMMARY

The present disclosure provides a method and system by which an engine is controlled when an out-of-range pressure sensor for a fuel delivery system is determined.

In one aspect of the invention, a method includes determining a pressure value for a pressure sensor in a fuel rail, determining the pressure value is out of range, determining a predicted pressure value and operating the engine using the predicted pressure value.

In a further aspect of the invention, a control module for determining a sensor error includes a pressure range determination module that determines a pressure value for a pressure sensor in a fuel rail is out of range, a fuel rail pressure estimate module that determines a predicted pressure value and an engine control module that operates the engine using the predicted pressure value.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the disclosure, its application, or uses. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the term boost refers to an amount of compressed air introduced into an engine by a supplemental forced induction system such as a turbocharger. The term timing refers generally to the point at which fuel is introduced into a cylinder of an engine (fuel injection) is initiated.

Figure 1:
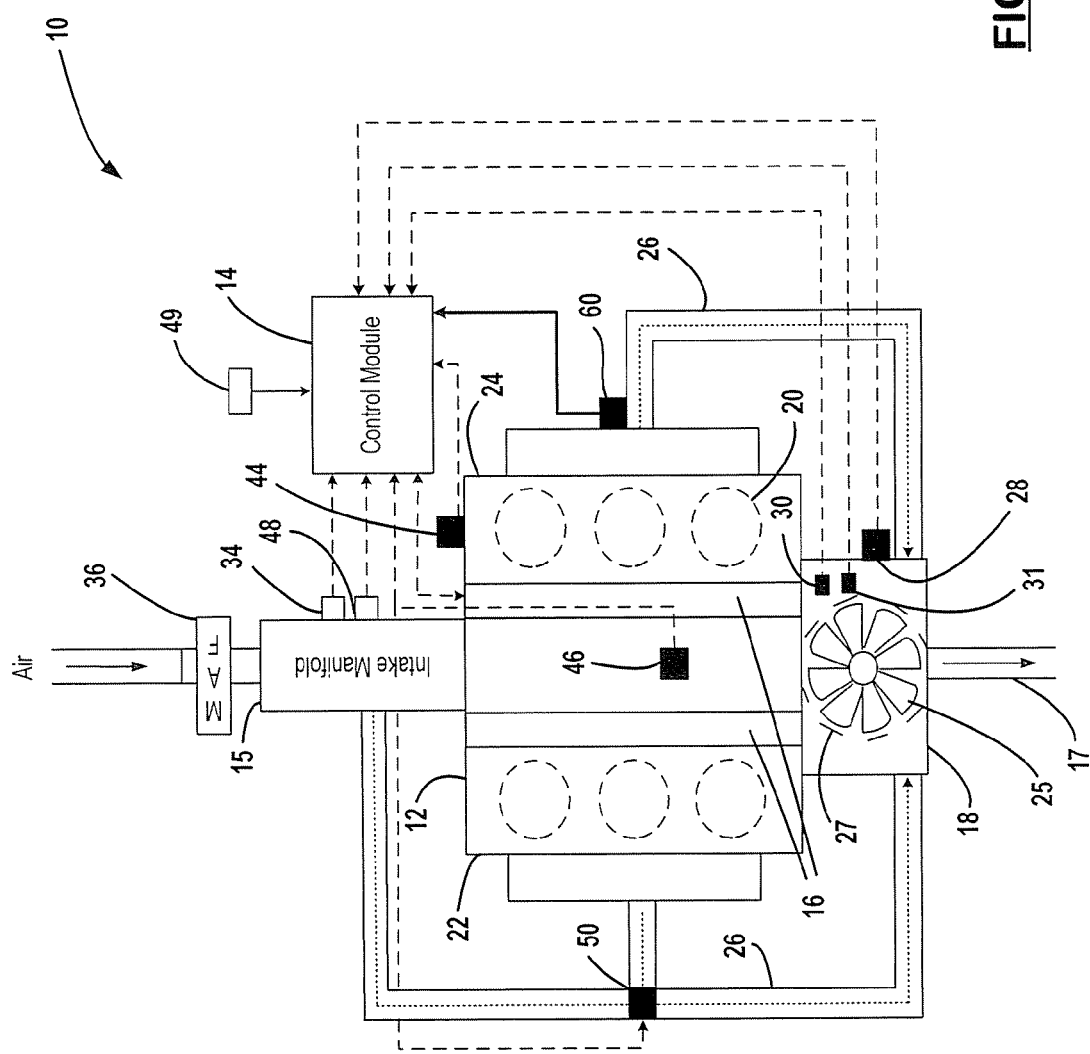
FIG. 1 is a functional block diagram of a control system that adjusts engine timing based on vehicle speed according to some implementations of the present disclosure.

Referring now to FIG. 1, an exemplary engine control system 10 is schematically illustrated in accordance with the present disclosure. The engine control system 10 includes an engine 12 and a control module 14. The engine 12 can further include an intake manifold 15, a fuel injection system 16 having fuel injectors (illustrated in FIG. 2), an exhaust system 17 and a turbocharger 18. The exemplary engine 12 includes six cylinders 20 configured in adjacent cylinder banks 22, 24 in a V-type layout. Although FIG. 1 depicts six cylinders (N=6), it can be appreciated that the engine 12 may include additional or fewer cylinders 20. For example, engines having 2, 4, 5, 8, 10, 12 and 16 cylinders are contemplated. It is also anticipated that the engine 12 can have an inline-type cylinder configuration. While a gasoline powered internal combustion engine utilizing direct injection is contemplated, the disclosure may also apply to diesel or alternative fuel sources.

During engine operation, air is drawn into the intake manifold 15 by the inlet vacuum created by the engine intake stroke. Air is drawn into the individual cylinders 20 from the intake manifold 15 and is compressed therein. Fuel is injected by the injection system 16, which is described further in FIG. 2. The air/fuel mixture is compressed and the heat of compression and/or electrical energy ignites the air/fuel mixture. Exhaust gas is exhausted from the cylinders 20 through exhaust conduits 26. The exhaust gas drives the turbine blades 25 of the turbocharger 18 which in turn drives compressor blades 25. The compressor blades 25 can deliver additional air (boost) to the intake manifold 15 and into the cylinders 20 for combustion.

The turbocharger 18 can be any suitable turbocharger such as, but not limited to, a variable nozzle turbocharger (VNT). The turbocharger 18 can include a plurality of variable position vanes 27 that regulate the amount of air delivered into the engine 12 based on a signal from the control module 14. More specifically, the vanes 27 are movable between a fully-open position and a fully-closed position. When the vanes 27 are in the fully-closed position, the turbocharger 18 delivers a maximum amount of air into the intake manifold 15 and consequently into the engine 12. When the vanes 27 are in the fully-open position, the turbocharger 18 delivers a minimum amount of air into the intake manifold of engine 12. The amount of delivered air is regulated by selectively positioning the vanes 27 between the fully-open and fully-closed positions.

The turbocharger 18 includes an electronic control vane solenoid 28 that manipulates a flow of hydraulic fluid to a vane actuator (not shown). The vane actuator controls the position of the vanes 27. A vane position sensor 30 generates a vane position signal based on the physical position of the vanes 27. A boost sensor 31 generates a boost signal based on the additional air delivered to the intake manifold 15 by the turbocharger 18. While the turbocharger implemented herein is described as a VNT, it is contemplated that other turbochargers employing different electronic control methods may be employed.

A manifold absolute pressure (MAP) sensor 34 is located on the intake manifold 15 and provides a (MAP) signal based on the pressure in the intake manifold 15. A mass air flow (MAF) sensor 36 is located within an air inlet and provides a mass air flow (MAF) signal based on the mass of air flowing into the intake manifold 15. The control module 14 uses the MAF signal to determine the mass of air flowing into the intake manifold. The mass of the intake air can be used to determine the fuel supplied to the engine 12 based on the A/F ratio in response to engine start, catalyst light-off, and engine metal overheat protection. An engine speed (RPM) sensor 44 such as a crankshaft position sensor provides an engine speed signal. An intake manifold temperature sensor 46 generates an intake air temperature signal. The control module 14 communicates an injector timing signal to the injection system 16. A vehicle speed sensor 49 generates a vehicle speed signal.

The exhaust conduits 26 can include an exhaust recirculation (EGR) valve 50. The EGR valve 50 can recirculate a portion of the exhaust. The controller 14 can control the EGR valve 50 to achieve a desired EGR rate.

The control module 14 controls overall operation of the engine system 10. More specifically, the control module 14 controls engine system operation based on various parameters including, but not limited to, driver input, stability control and the like. The control module 14 can be provided as an Engine Control Module (ECM).

The control module 14 can also regulate operation of the turbocharger 18 by regulating current to the vane solenoid 28.

The control module 14 according to an embodiment of the present disclosure can communicate with the vane solenoid 28 to provide an increased flow of air (boost) into the intake manifold 15.

An exhaust gas oxygen sensor 60 may be placed within the exhaust manifold or exhaust conduit to provide a signal corresponding to the amount of oxygen in the exhaust gasses.

Figure 2:
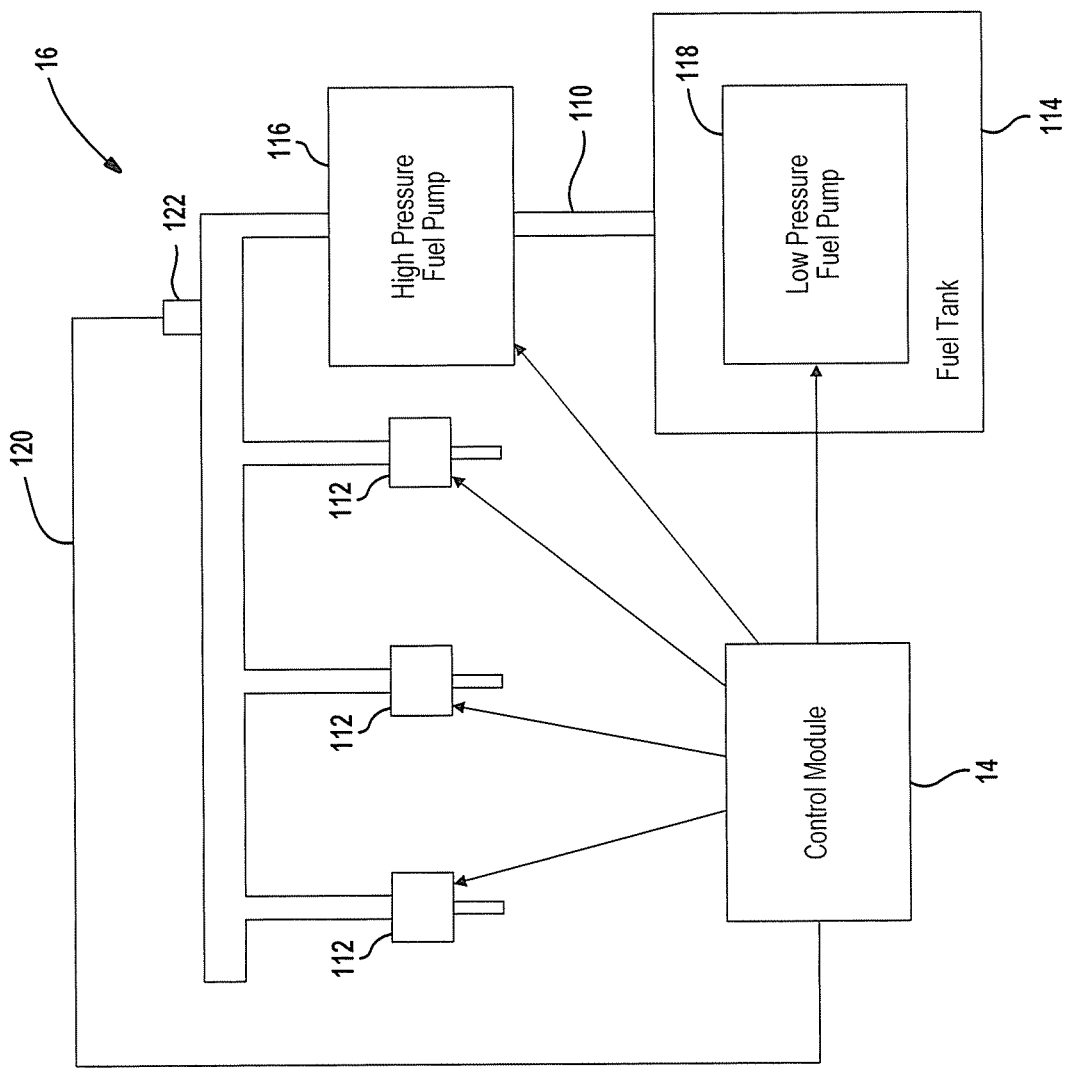
FIG. 2 is a functional block diagram of the fuel injection system according to the present disclosure.

Referring now to FIG. 2, the fuel injection system 16 is shown in further detail. A fuel rail 110 is illustrated having fuel injectors 112 that deliver fuel to cylinders of the engine. It should be noted that the fuel rail 110 is illustrated having three fuel injectors 112 corresponding to the three cylinders of one bank of cylinders of the engine 12 of FIG. 1. More than one fuel rail 110 may be provided on a vehicle. Also, more or fewer fuel injectors may also be provided depending on the configuration of the engine. The fuel rail 110 delivers fuel from a fuel tank 114 through a high-pressure fuel pump 116 and a low pressure pump 118. The low pressure pump 118 may be located within the fuel tank 114 to generate a fuel tank pressure. The control module 14 controls the fuel pumps 116, 118 in response to various sensor inputs including an input signal 120 from a pressure sensor 122. The control module 14 also controls the injectors 112. The operation of the system will be further described below.

Figure 3:
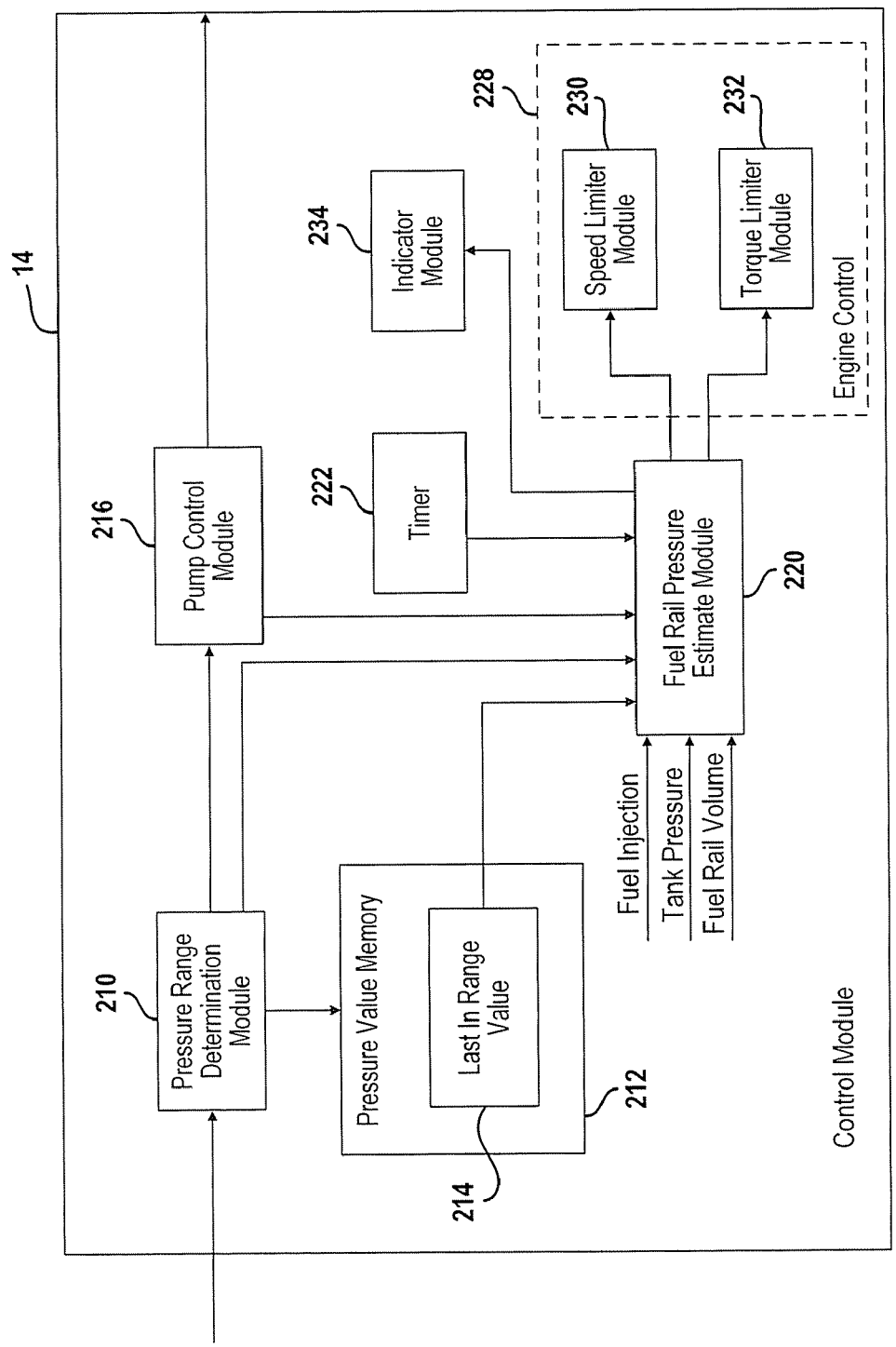
FIG. 3 is a block diagram of the control system of FIG. 1 for performing the method of the present disclosure.

Referring now to FIG. 3, the control module 14 of FIG. 1 is illustrated in further detail. The control module 14 may include a pressure range determination module 210 that determines whether pressure-sensor readings are out of range. The pressure-sensor values may be compared to a threshold or thresholds to determine whether the pressure sensor is out of range. As the pressure sensor values are determined, the pressure sensor values may be stored within a pressure value memory. The pressure value memory 212 may include a last value that is in range should the pressure sensor determination pressure range determination module 210 determine a pressure sensor reading is out of range.

The last in-range value stored within the last in-range value memory 214 may be used for various determinations including a fuel rail pressure estimate as will be described below. The pressure range determination module 210 provides pressure values to the pump control module 216. The pump control module 216 operates in response to the pressure values. However, when the pressure values are out of range, a fuel rail pressure estimate module 220 generates a fuel rail pressure estimate. The fuel rail pressure estimate is used to estimate the fuel in the fuel rail until the fuel in the fuel rail reaches the pressure provided by the low-pressure fuel pump 118. The fuel rail pressure estimate module 220 may estimate the amount of decay between the previous high pressure in the fuel rail and the low pressure provided by the low-pressure fuel pump. The decay may be determined in response to the amount of fuel being injected through the fuel injectors, the tank pressure which corresponds to the low-pressure fuel pump pressure, the fuel rail volume and other considerations. A timer 222 may also provide an input to the fuel rail pressure estimate module. Thus, the fuel rail pressure estimate may be based on a time from the timer 222 as well.

In response to the estimated fuel rail pressure, the engine may be limited in operation using the engine control module 228. For example, a speed limiter module 230 within the engine control module 228 may limit the speed of the engine due to the reduced capacity of providing fuel to the engine.

The fuel rail pressure estimate module 220 may also communicate the estimated fuel rail pressure to a torque limiter module 232 of the engine control module 228. The torque limiter module 232 may limit the amount of torque provided by the engine.

The fuel rail pressure estimate module 220 may also be in communication with an indicator module 234. The indicator module 234 may generate an audible indicator, a visual indicator, or a combination of the two. The indicator module 234 may provide an indication that the engine is operating in reduced capacity and that servicing is required.

Figure 4:
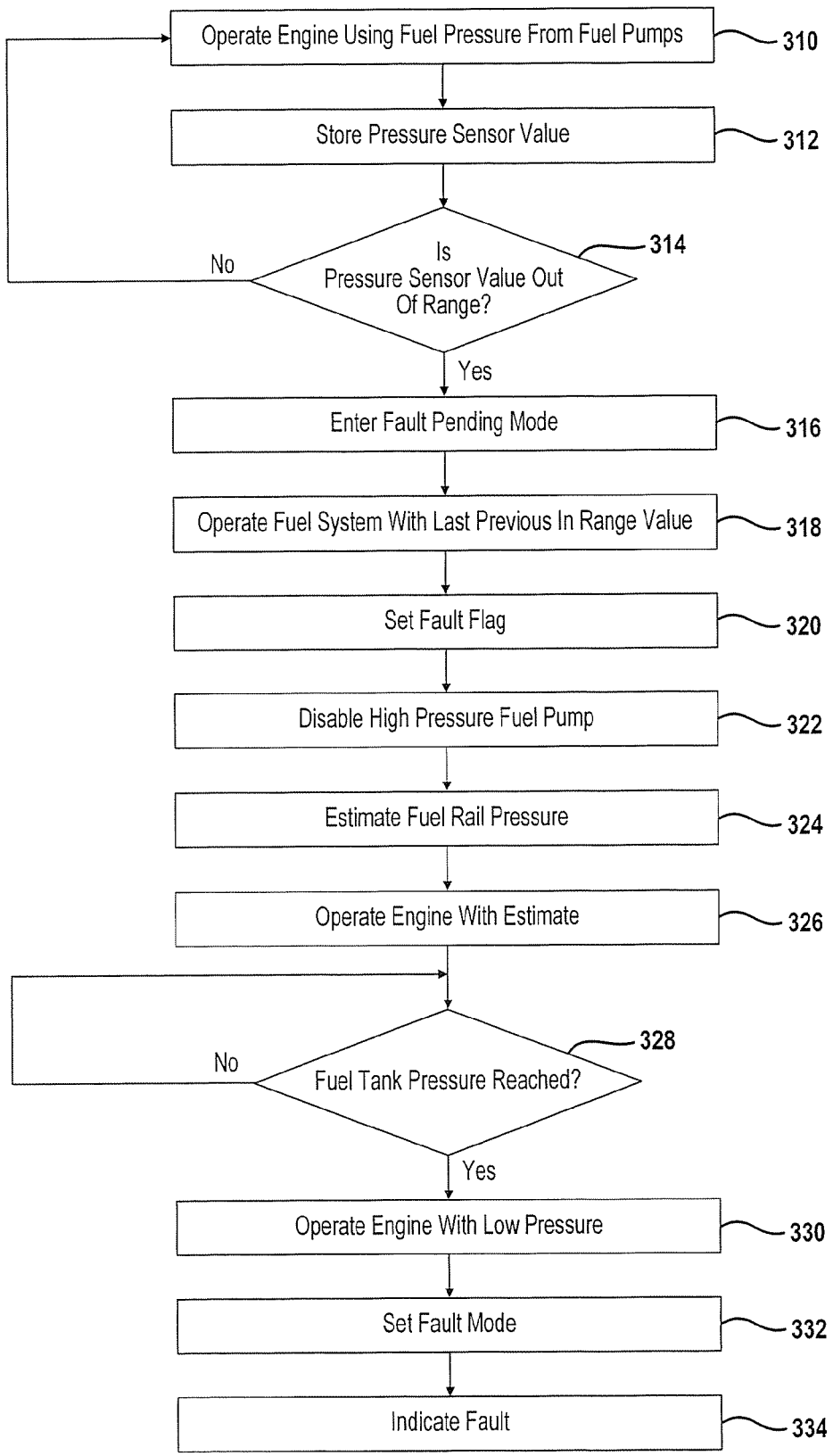
FIG. 4 is a flowchart of a method for determining a pressure sensor error.

Referring now to FIG. 4, a method for operating the engine is provided. In step 310, the fuel system is operated using the fuel pressure from the high-pressure fuel pump 116 and the low-pressure fuel pump 118 of FIG. 2. In step 312, pressure values from the pressure sensor 122 are stored within a memory of the control module 14. In step 314, it is determined whether a pressure sensor value is out of range. When a pressure sensor value is not out of range, the system continues to operate using the high-pressure fuel pump and the low-pressure fuel pump.

When the pressure sensor value is out of range in step 314, step 316 enters a fault-pending mode. In step 316, the fault-pending mode may be operated for a predetermined amount of time prior to setting a fault flag.

In step 318, the fuel system may be operated with the last previous pressure value for a predetermined amount of time. This will provide the fuel system with time to determine if the fault was an intermittent fault and to determine whether an in-range value may be provided.

After a predetermined amount of time, a fault flag in step 320 may be set. The fault flag may be set to provide remedial action. One remedial action may be to disable the high-pressure fuel pump in step 322. In step 324, the fuel rail pressure may be estimated based upon various fuel system factors, including the amount of fuel that has been injected since a fault was detected, the in-tank fuel pressure provided by the low-pressure fuel pump, the fuel rail volume, and other considerations. The estimated fuel-rail pressure may depend on various characteristics of the fuel system and thus may also be calibratable. In step 326, the engine and fuel system are operated with the estimated fuel-rail pressure. In step 328, it is determined whether the in-tank fuel pressure has been reached. When the in-tank fuel pressure has not been reached, step 328 is repeated. The fuel pressure estimate is allowed to decay to the in-tank fuel pressure provided by the low-pressure fuel pump in step 328. In step 330, the system is operated with the low pressure provided by the low-pressure fuel pump. In step 332, a fault mode may be set to indicate to a driver or service technician that a pressure sensor error has been detected. In step 334, a fault may be indicated by audible or visual means. The setting of the fault mode and indicator in steps 332 and 334 may be generated at various times.

Figure 5:
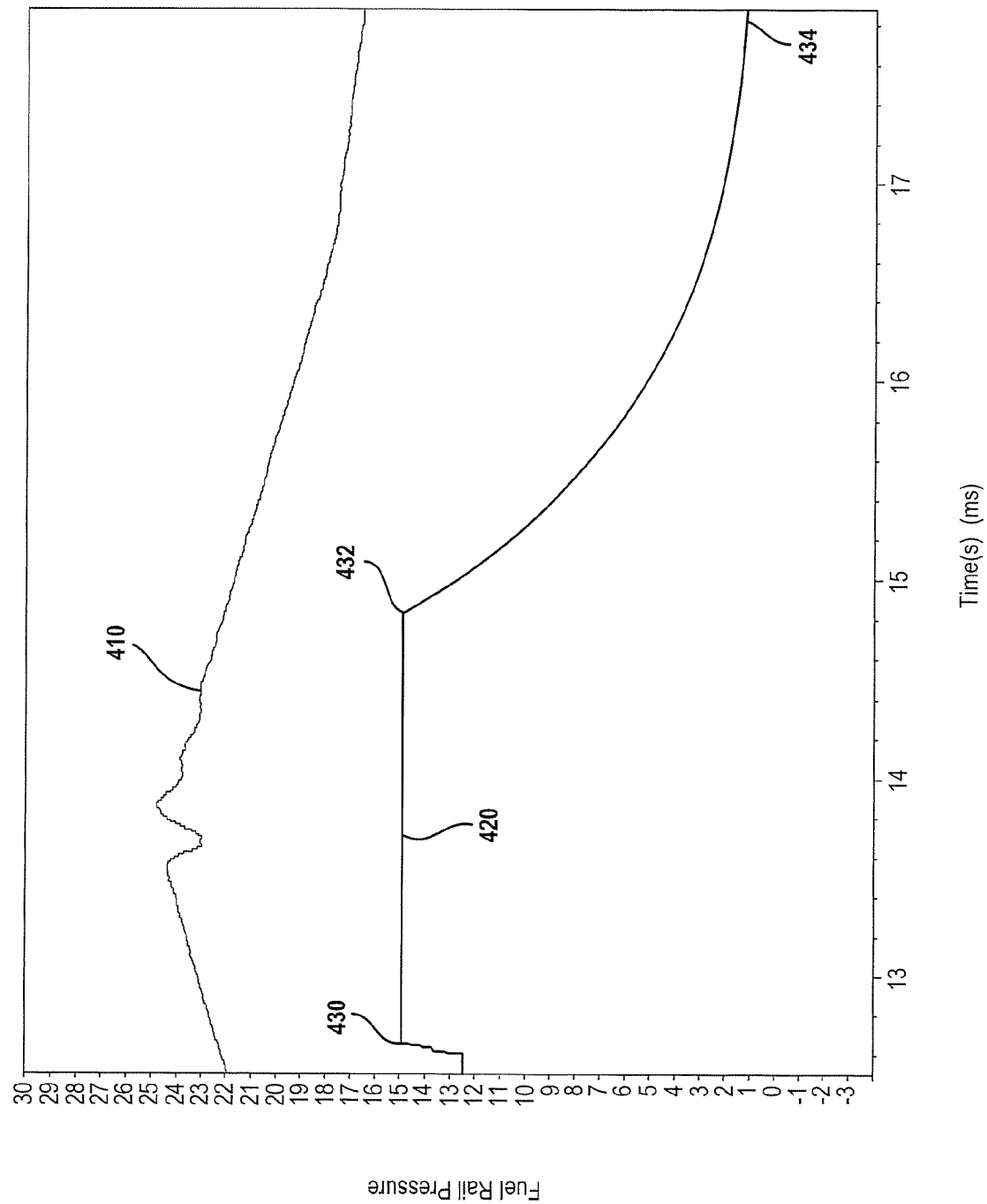
FIG. 5 is a plot of a fuel rail pressure versus time.

Referring now to FIG. 5, a plot of engine speed 410 and the fuel rail pressure 420 are set forth. At time 430, a fuel rail pressure sensor signal that is out of range is detected. At time 430, the fuel pressure of the last known value is used to operate the engine and the fuel system. At time 432, a fault may be set and the high-pressure fuel pump may be disabled. At any point during the process, if an in-range fuel pressure signal is received, the system may revert to operating with a good value of the pressure sensor. After time 432, the pressure is allowed to decay until the low pressure provided by the low-pressure sensor is achieved at time 434. The varying slope of the curved line between time 432 and 434 may be a calibratable value. The calibratable value may be based upon various considerations and fuel tank characteristics including the amount of fuel that is being injected, the in-tank pressure and the fuel rail volume.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A method comprising:
   determining a pressure value for a pressure sensor in a fuel rail,
   determining when the pressure value is outside of a predetermined range;
   determining a predicted pressure value; and
   altering an operating parameter of an engine based on the predicted pressure value when the pressure value is outside of the predetermined range.

2. The method of claim 1 wherein determining the pressure value comprises:
   determining a first pressure value and a second pressure value after the first pressure value.

3. The method of claim 2 wherein determining the pressure value is outside of the predetermined range comprises:
   determining the second pressure value is outside of the predetermined range.

4. The method of claim 2 wherein determining the predicted pressure value comprises:
   determining the predicted pressure value based on the first pressure value.

5. The method of claim 2 wherein determining a predicted pressure value comprises:
   determining the predicted pressure value based on the first pressure value and an amount of fuel injected since one of the pressure value and the second pressure value was determined.

6. A method of claim 2 wherein determining the predicted pressure value comprises:
   determining the predicted pressure value based on the first pressure value, a fuel rail volume and an amount of fuel injected.

7. The method of claim 2 wherein determining the predicted pressure value comprises:
   determining the predicted pressure value based on the first pressure value and a fuel tank pressure.

8. The method of claim 2 wherein determining the predicted pressure value comprises:
   determining the predicted pressure value based on the first pressure value, a fuel rail volume, an amount of fuel injected one of the pressure value and the second pressure value was determined and a fuel tank pressure.

9. The method of claim 1 wherein operating the engine using the predicted pressure value comprises:
   operating the engine with a limited engine speed based on the predicted pressure value.

10. The method of claim 1 wherein operating the engine using the predicted pressure value comprises:
    operating the engine with a limited engine torque based on the predicted pressure value.

11. The method of claim 1 wherein operating the engine using the predicted pressure value is performed until a low pressure fuel pump pressure is reached within a fuel rail.

12. The method of claim 1 further comprising disabling a high pressure pump after determining that the pressure value is outside of the predetermined range.

13. The method of claim 1 further comprising generating an indicator when operating the engine based on the predicted pressure value.

14. A control module comprising:
    a pressure range determination module that determines a pressure value for a pressure sensor in a fuel rail is outside of a predetermined range;

a fuel rail pressure estimate module that determines a predicted pressure value; and an engine control module that operates an engine based on the predicted pressure value when the pressure value is outside of the predetermined range.

15. The control module of claim 14 wherein pressure range determination module determines a second pressure value after the first pressure value.

16. The control module of claim 14 wherein the predicted pressure value is based on the first pressure value.

17. The control module of claim 14 wherein the predicted pressure value is based on the first pressure value and an amount of fuel injected since one of the pressure value and the second pressure value was determined.

18. The control module of claim 14 wherein the engine control module operates the engine using the predicted pressure value with at least one of a limited engine speed or a limited engine torque based on the predicted pressure value.

19. The control module of claim 14 wherein the engine control module operates the engine using the predicted pressure value until a low pressure fuel pump pressure is reached within a fuel rail.

20. A system comprising:
a high pressure pump; and
the control module of claim 14 that disables the high pressure pump after determining the pressure value is out of range.

* * * * *